United States Patent Office 3,337,656
Patented Aug. 22, 1967

3,337,656
N-(2-CHLOROALKYL)-PHOSPHORAMIDO-THIONATES
George G. Curtis, Elizabeth, and Bernard Buchner, Westfield, N.J., assignors, by mesne assignments, to Continental Oil Company, a corporation of Delaware
No Drawing. Filed July 16, 1963, Ser. No. 295,541
2 Claims. (Cl. 260—959)

This application is a continuation-in-part application of our copending application Serial No. 62,884 filed October 17, 1960, now abandoned, and is a continuation-in-part of our pending application, Serial No. 250,775 filed January 11, 1963, now U.S. Patent 3,207,661.

The novel products of this invention have the following general structure:

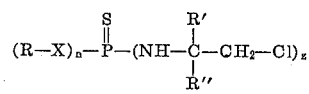

wherein $n$ is a digit selected from the group consisting of one and two, wherein $z$ is a digit selected from the group consisting of (a) one when $n$ is two and (b) two when $n$ is one, wherein R' and R" are selected from a group consisting of hydrogen and a hydrocarbyl radical which is a member of the class consisting of alkyl radicals and aryl radicals containing 1–12 carbon atoms, wherein X is selected from the group consisting of oxygen, sulfur and nitrogen and wherein R is a radical selected from the group consisting of (i) aliphatic, (ii) aryl, (iii) alkaryl, (iv) aralkyl, (v) alicyclic and (vi) heterocyclic radicals when X is as aforesaid and (vii) wherein R is the nitrogen-free portion of a heterocyclic radical having nitrogen as a heteroatom in the ring and bonded to the phosphorus atom when X is nitrogen. The radicals represented by R may be substituted, like halo-substituted, alkoxy-substituted or tert-amino-substituted. The aliphatic radicals include alkyl and alkenyl radicals. The compounds include N-(2-chloroethyl) and N-(2-substituted chloroethyl) disubstituted phosphoramidothionate and N,N'-bis(2 - chloroethyl) and N,N' - bis(2-substituted chloroethyl) monosubstituted phosphoramidothionates.

One of the objects of this invention is to produce new biocidal compositions containing the above described novel compounds. As the term is used herein, biocidal compositions are active either as herbicides or as pesticides, or both. Pesticides include insecticides or chemosterilants for insects. Another object of this invention relates to methods to produce the novel compounds. Other objects can be seen from the description following below.

According to the preferred method of this invention the compounds are prepared by reacting (1-aziridinyl)-phosphinothioic acid derivatives with gaseous hydrogen chloride. The presence of an inert solvent during the reaction is preferred. Suitable temperature limits are from about —25° C. to about 50° C. Depending on whether $z$ is one or two, the starting materials are mono-aziridinyl or bis-aziridinyl compounds. They have the following general structure:

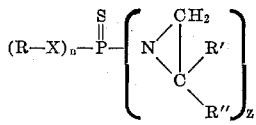

wherein R, R', R", X, $n$ and $z$ are as described above.

The mono-aziridinyl compounds are prepared from disubstituted phosphorochloridothionates and the bis-aziridinyl compounds from monosubstituted phosphorodichloridothionates by reacting them with ethylenimine or a substituted ethylenimine in the presence of a base, which acts as an acid acceptor. The reaction scheme is as follows:

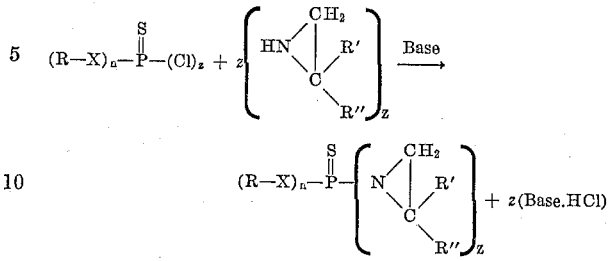

The reaction scheme for the preparation of the compounds of this invention is as follows:

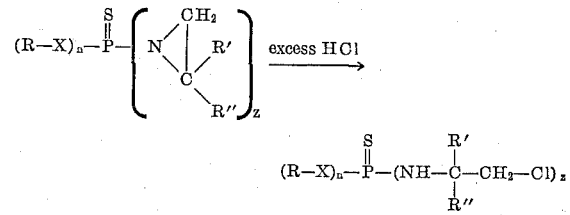

In both equations, R, R', R", X, $n$ and $z$ are as described above.

In the novel compounds of this invention where X is oxygen, R may be a substituted or unsubstituted (hydrocarbyl) aliphatic radical containing from one to eighteen carbon atoms ($C_1$–$C_{18}$), preferably from two to twelve carbon atoms. The aliphatic radical can be straight chain or branched chain and saturated or unsaturated. Suitable examples of unsubstituted hydrocarbyl aliphatic radicals are the alkyl and alkenyl radicals, such as methyl, ethyl, n-propyl, isopropyl, n-butyl, isobutyl, n-amyl, isoamyl, hexyl, 2-ethylbutyl, heptyl, 2-methylpentyl, 3-methylethyl, n-octyl, 2-ethylhexyl, nonyl, decyl, undecyl, dodecyl, tridecyl, tetradecyl, hexadecyl, heptadecyl, 3,5,5-trimethylhexyl octadecyl, as well as the corresponding alkenyl radicals, e.g. octadecenyl, undecenyl, etc.

When R is a substituted aliphatic radical, such as a substituted alkyl radical and X is oxygen, the following radicals are suitable: 2-chloroethyl, 3-chloro-1-propyl, 4-chloro-1-butyl, 2-methoxyethyl, 2-ethoxyethyl, 2-propoxyethyl, 2 - butoxyethyl, methoxy-methoxy-ethyl, the alkyl radical of the oxoalcohol of a propylene dimer, as well as a substituted alkyl radical derived from tertiary aminoalcohols, e.g. dimethylaminoethyl, dimethylaminoethyl, diisopropylaminoethyl and dibutylaminoethyl.

When R is an aryl radical, preferably an aryl radical containing 6–18 carbon atoms (including alkaryl and aralkyl radicals), the following radicals are suitable: phenyl, cresyl, naphthyl, xylyl, benzyl, beta-phenylethyl, phenylpropyl, cinnamyl and styryl.

When R is a substituted aryl radical and X is oxygen, the following radicals are suitable: 4-chlorophenyl, 2,4,5-trichlorophenyl, petachlorophenyl, 4-bromo-2, 6-dichlorophenyl, 2,4,6-trichlorophenyl, 3,4-dichlorophenyl, 2,3,4,5-tetrachlorophenyl, 2-cyclohexylphenyl, 4-methoxyphenyl, 2,6-dicyclohexyl-4-methyl-phenyl, 4-cyclohexylphenyl, 3-ethylphenyl, 4-nonyl-phenyl, 4-methylphenyl, 3,4-di methylphenyl, 4-tertiarybutyl-2-chlorophenyl and 2-chloro-4-cyclohexylphenyl.

When R is an alicyclic radical, preferably containing 3–18 carbon atoms, the following radicals are suitable: cyclopentyl, cyclopropyl, cyclobutyl, cyclohexyl, as well as their corresponding halo-substituted, methoxy-substituted and tert-amino-substituted radicals.

When R is a heterocyclic radical, preferably a heterocyclic radical containing 5–12 carbon atoms, the following are suitable: furfuryl and tetrahydrofurfuryl, as well as their corresponding halo-substituted, methoxy-substituted and tert-amino-substituted radicals.

In the instance where X is sulfur, R may be any of the radicals identified hereinabove where X is oxygen, such as one of the following radicals: methyl, ethyl, propyl, butyl, amyl, hexyl, heptyl, octyl, nonyl or the radicals derived from thiophenol (phenyl), 4-chlorothiophenol (4-chlorophenyl), 2,5-dichlorothiophenol (2,5-dichlorophenyl), 2,4,5-trichlorothiophenol (2,4,5-trichlorophenyl) the thiocresols, benzyl mercaptan (benzyl), cyclohexyl mercaptan (cyclohexyl), alpha-furfuryl mercaptan, beta-chloropropyl mercaptan, etc.

A suitable R radical, where X is sulfur, is: p-chlorophenyl-.

As stated above, where X is nitrogen, R may also be the nitrogen-free portion of a heterocyclic radical having nitrogen as a heteroatom in the ring and bonded through said nitrogen to the phosphorus atom. The compounds yielding these entire heterocyclic radicals inclusive the nitrogen atom can be illustrated by hexamethylenimine, piperidine, morpholine and pyrrolidine. They contain preferably a monoimine group.

Where X is nitrogen, R may be a di-alkyl group, like dimethyl, or diethyl, derived from dimethylamine and diethylamine respectively.

The mono-aziridinyl and bis-aziridinyl compounds are derivatives of ethylenimine. The ethylenimine employed in the preparation of the aziridinyl compounds may be substituted at one of the carbon atoms. The following compounds are illustrative of such substituted ethylenimines:

2-methylethylenimine,
2-ethylethylenimine,
2,2-dimethylethylenimine,
2-propylethylenimine,
2,2-diethylethylenimine,
2-hexylethylenimine,
2-ethyl-2-phenylethylenimine,
2-propyl-2-phenylethylenimine,
2-phenylethylenimine.

The substituents of these substituted ethylenimines are carried as R' and R'' into the compounds of this invention.

The compounds herein described are derivatives of thiophosphoryl chloride. In connection with phosphorylchloride derivatives it is known in the art to react bis-(O-alkyl) chlorophosphates, like $(C_2H_5O)_2P(O)Cl$, with ethylenimine in absence of an acid acceptor. This process is stated to give in high yields compounds of the type of $(C_2H_5O)_2P(O)(NH-CH_2-CH_2-Cl)$. We have found that thiophosphoryl chloride derivatives differ in behavior from phosphoryl chloride derivatives in reactions with ethylenimine and substituted ethylenimines. With thiophosphoryl chloride derivatives it is possible to obtain aziridinyl compounds in aqueous medium whereas this is impossible with the corresponding phosphoryl chloride derivatives. We have also found, that with thiophosphoryl chloride derivatives the process of the art, above referred to, does not produce satisfactory results. Yields are low and identification by elemental analysis does not show agreement with the theoretical nitrogen or chlorine content. In addition to the open chain compounds a large proportion of cyclic, i.e. aziridinyl compounds are also formed. The resulting product is a mixture of these two types of compounds. (See Examples 4 and 5.) In contrast thereto, we have found, that if the preferred method of this invention is used and first the aziridinyl compound is prepared in the presence of an acid acceptor and this is then reacted with hydrogen chloride, high yields are obtained and the identity of the products is proven by elemental analysis. We have further found, that the preferred method of this invention works well with di-aziridinyl compounds also and permits the formation of N,N'-bis(2-chloroethyl) thiophosphoramides and N,N'-bis(2-substituted chloroethyl) thiophosphoramides.

In addition to the preferred method, the products of this invention can be prepared by two additional methods. The first such method consists of reacting disubstituted thiophosphoryl monochlorides with ethanolamine in the presence of a base and chlorinating the so formed compounds. Substituted ethanolamines may also be used. The following is the reaction scheme:

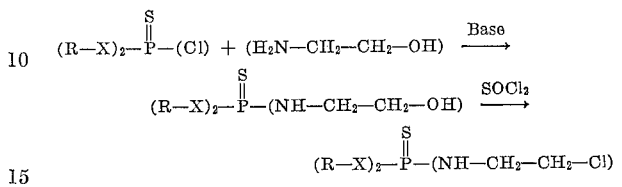

wherein R and X have the same meaning as described above. Thionyl chloride is the chlorinating agent in this method. The second such method consists of reacting excess thiophosphoryl chloride with 2-chloroethylamine hydrochloride, separating the so obtained N-(2-chloroethyl) thiophosphoryl dichloride and reacting the latter with the desired alcohol, amine or thioalcohol in the presence of a base according to the following scheme:

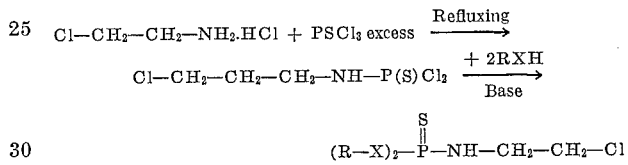

wherein X is as defined further above.

The biocidal compositions are preapared from the active compounds of this invention in the manner generally known in the art. They are used in conjunction with gaseous, liquid or solid inert carriers customarily employed in the production of herbicidal and pesticidal compositions, such as dusting powders, suspensions, emulsions, solutions, aerosols, wettable powders, etc. As illustrated, they may be incorporated into the food of the pests and properly dispersed therein. For insecticidal and herbicidal use sprays and aerosols or dusts may be used.

Solvents may include acetone, methyl alcohol, isopropyl acetate, butyl carbitol acetate, isopropyl alcohol, cyclohexane, cyclohexanone, benzene, xylene, methylated naphthalenes (also known as aromatic petroleum derivative solvents), carbon tetrachloride, methyl chloride and others, either alone or in admixture. The methylated naphthalenes in Kauri-Butanol values range from about 65 to about 100, in initial boiling point from about 485° to about 590° F.

Solid carriers may be selected from talc, clay, kaolin, lime, bentonite, pumice, fuller's earth, absorbent silicas, pyrophilite, etc., preferably in finely divided state. These can be applied as pesticidal or herbicidal ducts, or wettable powders with the addition of surface active agents. The latter can be made into water suspensions or dispersions.

For aerosol application liquefied gases are used as solvents, such as fluorochlorethanes, fluorochlormethanes or methyl chloride and they are applied from aerosol bombs made from the solutions.

Solvent solutions may be converted to water suspensions or emulsions. For the preparation of emulsions or wettable powders surface active agents are incorporated into the biocidal compositions. In preparing emulsions they aid emulsification, whereas in preparing wettable powders they aid suspension and dispersion properties. The following is a list of some useful surface active agents:

Triton X–161, a blend of alkyl aryl polyether alcohols with organic sulfonates;

Pluronic L–61, a condensate of ethylene oxide with a hydrophobic base formed by condensing propylene oxide with propylene glycol;

Marasperse N, sodium lignosulfonate;
Igepal CO–730, an alkylphenoxypoly-(ethylenoxy)-ethanol formed by condensing nonylphenol with ethylene oxide;
Diglycol oleate;
p-Isooctyl phenyl ether of polyethylene glycol;
Polyalkylene glycol derivatives;
Alkylbenzenesulfonates;
Alkene sulfonates;
Alkyl sulfates, such as fatty alcohol sulfates;
Condensation product of 1 mol of octyl phenol with 8 mols of ethylene oxide;
Naphthalene sulfonates and alkyl naphthalene sulfonates;
Ricinoleic acid butyl ester sulfonate.

With regards to surface active agents for oral application of chemosterilants, lack of toxicity is a requirement. In insecticidal application toxicity of a surface active agent may be an added advantage, as in preparations for this type of application addition of secondary toxicants is frequently desirable.

Water suspensions can be prepared by dissolving the water-insoluble active compound in a water miscible solvent, like acetone, and adding this solution to water under agitation. By another method a water wettable dry powder mixture is prepared, e.g. containing a water dispersible clay carrier, with or without the presence of surface active agents and this mixture is dispersed in water prior to use.

Concentrated biocidal compositions may contain 0.1% to 10% by weight of active compound and 99.9% to 90% of inert carrier, such as solvent, water, solid powder carriers, surface active agents and their admixture.

The examples below are for illustrative purposes only and do not limit the scope of this invention. The process of preparation is illustrated by O-alkyl-substituted products, where X is oxygen and R is an alkyl group. The examples marked by letter represent the preparation of the intermediate aziridinyl compounds, which are the starting materials for the preparation of the compounds of this invention.

ILLUSTRATIVE EXAMPLES

*Example A.—Preparation of O,O'-dimethyl, N-ethylene thiophosphoramide*

In this preparation a 1000 ml. three-necked round-bottom flask was used, equipped with a sealed stirrer, a dropping funnel and a thermometer. In this flask 106.0 grams (1.0 mol) of sodium carbonate (as acid acceptor) and 23.6 grams (0.55 mol) of ethylenimine were dissolved in 700 ml. water. The resulting solution was cooled to 5° C. and 80.4 grams (0.5 mol) of O,O'-dimethyl thiophosphoryl monochloride was added under fast agitation dropwise to the aqueous solution, while the temperature was maintained at 5° C. After the addition was completed, mixing is continued for one hour at this temperature. The organic layer is separated and dried over anhydrous magnesium sulfate. The separated water layer is extracted with benzene, the extract dried and the solvent removed by distillation under vacuum at low temperature. The dried organic layer and the solvent-free extraction residue are combined and redistilled under high vacuum to obtain the purified end-product. The resulting product is O,O'-dimethyl, N-ethylene thiophosphoramide, also called phosphonothioic acid, (1-aziridinyl)-, O,O'-dimethyl ester. This product is the starting material in Example 1.

*Example B.—Preparation of O,O'-diethyl, N-ethylene thiophosphoramide*

The reaction of Example A was repeated, leaving the quantity of sodium carbonate and ethylenimine unchanged, but using as third reactant 94.0 grams (0.5 mol) of O,O'-diethyl thiophosphoryl monochloride. All other reaction conditions were as in Example A. The resulting product was O,O'-diethyl, N-ethylene thiophosphoramide, also called phosphonothioic acid, (1-aziridinyl-, O,O'-diethyl ester. This product is the starting material in Example 2.

*Example C. —Preparation of O-isoamyl,N,N'-diethylene thiophosphoramide*

The procedure of Example A was repeated, using however a 5 l. flask. 545.7 grams of hydrated sodium carbonate (4.4 mols) and 94.8 grams of ethylenimine (2.2 mols) were dissolved in 3500 ml. of water. 221.0 grams of O-isoamyl thiophosphoryl dichloride (about 1.0 mol) were added incrementally to the resulting aqueous solution. Other reaction conditions were as described in Example A. Purification was by redistillation at 65–80° C. and a pressure in the range of 20–70 microns Hg absolute. The resulting product was O-isoamyl, N,N'-diethylene thiophosphoramide, also known by a different terminology as phosphinothioic acid, bis(1-aziridinyl)-, O-isopentyl ester. This product is the starting material for Example 3. It should be noted that Examples A, B and C were carried out in aqueous medium, which is not practical for the corresponding oxo-compounds, derived from $POCl_3$.

*Example 1.—O,O'-dimethyl, N-(2-chloroethyl) thiophosphoramide*

100.0 grams (0.6 mol) of O,O'-dimethyl, N-ethylene thiophosphoramide, the product of Example A, was mixed with 2000 ml. benzene and the resulting solution was cooled to 10° C. At this temperature 24.2 grams (0.66 mol) of gaseous hydrogen chloride was slowly introduced into the solution and absorbed therein. The mixture was left standing overnight. Next morning 12.1 grams (0.33 mol) gaseous hydrogen chloride was introduced and absorbed in the reaction mixture at 10° C. and left again standing overnight. Next morning the reaction mixture was heated to 50° C. and 12.1 grams (0.33 mol) gaseous hydrogen chloride was again introduced and the mixture was left standing overnight. Part of the solvent was removed at 35° C., under vacuum, leaving about 500 ml. of concentrated solution. This was washed with an aqueous 5% sodium carbonate solution, and subsequently washed with distilled water. The solution was then dried over anhydrous magnesium sulfate, filtered and the remaining solvent removed. The yield of the crude product was 90%. This was purified in a molecular still. The product is a high boiling liquid, identified as O,O'-dimethyl, N-(2-chloroethyl) thiophosphoramide:

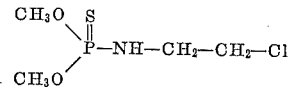

The density ($d_4^{20}$) was 1.29 and the refractive index ($N_D^{20}$) was 1.5057. Total introduced quantity of HCl was 1.32 mols.

*Example 2.—O,O'-diethyl, N-(2-chloroethyl) thiophosphoramide*

In this example a similar procedure and reaction was carried out as described in Example 1. 192.2 grams (1.0 mol) of O,O'-diethyl, N-ethylene thiophosphoramide (the product of Example B) was mixed with 3000 ml. benzene and the resulting solution cooled to 10° C. A total of 72.9 grams (2.0 mols) of gaseous hydrogen chloride was absorbed in three increments in said solution, and followed by solvent removal and washing, all as described in Example 1. The crude product was purified in the molecular still. The resulting product was a high boiling liquid, O,O'-diethyl, N-(2-chloroethyl) thiophosphoramide:

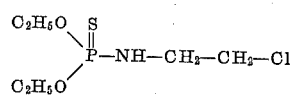

The density ($d_4^{20}$) was 1.189 and the refractive index ($N_D^{20}$) was 1.4918. The analytical data obtained were as follows:

|  | Calculated | Found |
|---|---|---|
| Phosphorus, percent | 13.37 | 13.72 |
| Nitrogen, percent | 6.05 | 6.00 |
| Chlorine, percent | 15.30 | 15.30 |

*Example 3.—O-isoamyl, N,N',-bis(2-chloroethyl) thiophosphoramide*

In this example a similar procedure and reaction was carried out as described in Example 1. 117.2 grams (0.5 mol) of O-iso-amyl, N,N'-diethylene thiophosphoramide (product of Example C) was mixed with 200 ml. benzene. The resulting solution was cooled to 10° C. Then 146.0 grams (4.0 mols) of gaseous hydrogen chloride was absorbed in three increments in said solution, and followed by solvent removal and washing, all as described in Example 1. The crude product was purified by distillation in a molecular still and the resulting high boiling product was O-iso-amyl, N,N'-bis(2 - chloroethyl) thiophosphoramide:

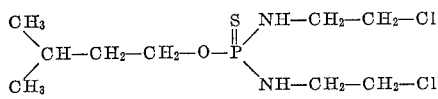

The density ($d_4^{20}$) was 1.216 and the refractive index ($N_D^{20}$) was 1.5209. Elemental analysis gave good agreement between calculated and found values for phosphorus, sulfur and nitrogen:

|  | Calculated | Found |
|---|---|---|
| Phosphorus, percent | 10.08 | 10.55 |
| Nitrogen, percent | 9.12 | 8.96 |
| Sulfur, percent | 10.44 | 10.93 |

With regard to the reaction conditions described in Examples 1 to 3, a few additional remarks may be made. The low initial temperature at which the gaseous hydrogen chloride is introduced, facilitates its absorption. Higher temperature can be tolerated, but may require larger excess of hydrogen chloride and/or inert solvent. Higher temperatures may also cause hydrolysis of the ester groups, where these are present, and may form decomposition products. Instead of introducing the gaseous hydrochloric acid in increments, it could be added in one step, but this also may require more solvent or a larger excess of hydrochloric acid. The gaseous hydrochloric acid is well absorbed by the solutions of the aziridinyl compounds. Benzene was used in the above examples as inert solvent. This may be replaced by other inert solvents. In selecting an inert solvent consideration has to be given to its property to dissolve the aziridinyl compounds and in their presence to absorb gaseous hydrogen chloride. Ethyl ether, e.g. has good solubility characteristics for gaseous hydrogen chloride.

As mentioned further above, it is known in the art to produce compounds having the structure of $(RO)_2P(O)$ $(NHCH_2CH_2Cl)$ by reacting $(RO)_2P(O)Cl$ with ethylenimine in the absence of an acid acceptor. In this schematic formula R is an alkyl group. In order to find out, whether the same reaction would work with $(RO)_2P(S)Cl$ type compounds, two reactions were carried out in Examples 4 and 5 in trying to reproduce the product of Example 1.

*Example 4*

Solution A was prepared by mixing 80.25 grams (0.5 mol) of $(CH_3O)_2P(S)Cl$ with petroleum ether to a total volume of 200 ml. Solution B was prepared by mixing 22.0 grams (0.51 mol) of ethylenimine with petroleum ether to a total volume of 200 ml. The petroleum ether used had a boiling range of 38° to 42° C. 300 ml. of petroleum ether was charged to the reaction flask and the temperature maintained at 25° C. Solutions A and B were introduced simultaneously dropwise under fast agitation into the reaction flask, while maintaining the temperature at 25° C. Upon addition the solution became turbid and some white crystalline solids formed. The mixture was left standing for 14 days, then the solvent was removed under vacuum. The crude product was purified in the molecular still by distillation. The yield was only 22% and represented a mixture of the desired open chain compound with the cyclic aziridinyl compound.

Open chain compound: $(CH_3O)_2P(S)(NH-CH_2-CH_2-Cl)$

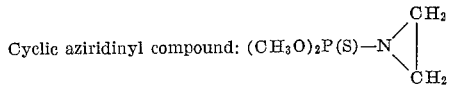

The density ($d_4^{20}$) was 1.247, the refractive index ($N_D^{20}$) was 1.5070, boiling range at 1 mm. Hg: 40°–50° C. nitrogen content calculated 6.88%, found 7.66%. The nitrogen content figures indicate also the presence of a larger proportion of the cyclic compound.

*Example 5*

In this example chloroform was used as solvent. Solution A was prepared by mixing 40.1 grams (0.25 mol) of $(CH_3O)_2P(S)Cl$ and chloroform to a total volume of 150 ml. Solution B was prepared by mixing 11.2 grams (0.26 mol) of ethylenimine with chloroform to a total volume of 150 ml. 200 ml. of chloroform was charged into the reaction flask and cooled to −15° C. Solutions A and B were introduced simultaneously dropwise with fast stirring into the solvent in the reaction flask, while maintaining the temperature at −15° C. After addition was completed, the mixture was stirred for one hour, while maintaining the temperature at −15° C. The mixture was then allowed to warm up to room temperature and stirring was continued for additional two hours. After standing for two days a waxy yellow semi-solid separated and was removed by filtration. It gave 11.2% nitrogen content vs. the calculated 6.88% expected. The solvent of the filtrate was removed under vacuum and the crude product distilled in the molecular still. The yield was 33.3%, the refractive index ($N_D^{20}$) was 1.5083, boiling range at 0.7 mm. Hg was 55° C., nitrogen content calculated: 6.88%, found: 7.67%. Disregarding the waxy product with still higher nitrogen content, the results indicate the presence of a mixture of the open chain compound and the cyclic aziridinyl compound.

In contrast to Examples 4 and 5, Example 1 was well identified as giving in high yield the open chain compound, verified also by the following analytical data:

|  | Calculated | Found |
|---|---|---|
| Nitrogen, percent | 6.88 | 6.78 |
| Phosphorus, percent | 15.21 | 15.39 |

Examples 4 and 5 show, that the prior art process, satisfactory for $POCl_3$ derivatives, does not work well with the $PSCl_3$ derivatives of this invention. It gives unsatisfactory low yields, produces byproducts of crystalline (Example 4) or waxy (Example 5) character and yields admixtures of open chain and cyclic aziridinyl compounds, instead of the pure desired open chain compounds alone.

The products of this invention can form intermediates for further chemical synthesis. As an example a condensation reaction to form bisphosphoro compounds, may be mentioned:

The same bisphosphoro compound can also be prepared by the aid of magnesium in a two-step Grignard type reaction.

In illustrating the biocidal activity of the products of this invention, illustration will be made on the products of Examples 1 and 2. It should be noted, that the product of Example 3 and other products made within the scope of this invention have similar activity than shown below for the products of Examples 1 and 2.

The product of Example 1, [O,O'-dimethyl, N-(2-chloroethyl) thiophosphoramide], was tested first on a herbicidal screening test. The method used was a water-media test. In this test the active materials were prepared as 1%, 0.1% and 0.01% solutions or fine suspensions in deionized water. Wherever required, suitable solvents are used to accomplish the formation of solutions or fine dispersions. Fifty radish seeds and fifty wheat seeds are placed in the closed jars containing 100 ml. of the solution and kept under mild mixing for 24 hours. The seeds are then thoroughly washed with tap water and placed in moist paper towels for germination. The germinating cabinet, containing the towels, is kept warm and humid during the test. Six days later observation is made. Percentage of germination and notations of any abnormal seedling growth are recorded. The radishes represent dicots and wheat represents monocots. In this test, as stated, wheat and radishes were applied. The product of Example 1 affected both plants. No selectivity was shown between the two plants. Over 90% non-germination resulted at 1% concentration of the product and less than 30% non-germination at 0.1% concentration. The product of Example 2, [O,O'-diethyl, N-(2-chloroethyl) thiophosphoramide ], in the same test showed selectivity for wheat, affecting this more than radishes. At 1% concentration more than 90% non-germination resulted and at 0.1% concentration the non-germination was less than 30%. On radishes the effect was much less, indicating selectivity for wheat.

A second germination test was made with the product of Example 2. Two grams of the product was dissolved in 15 ml. of acetone and 185 ml. of an aqueous solution of a dispersing agent, containing the latter at 0.1% concentration, was added. The resulting master solution had 1% concentration of the product of Example 2. Petri plates containing 1 gram of soil of −20 mesh were treated with the 1% solution to yield 2500 p.p.m. concentration of active ingredient in the final dilution. The plates were seeded with 12 corn, 12 bean, 25 wheat and 25 radish seeds. They were then allowed to germinate 5 days in a warm dark room. Percent germination and growth effects were then recorded. The results were as follows:

|  | Germinated with normal growth, percent | Germinated with restricted or abnormal growth, percent | Non-germinating percent |
|---|---|---|---|
| Monocots: | | | |
| Wheat | 0 | 0 | 100 |
| Corn | 4 | 96 | 0 |
| Dicots: | | | |
| Radish | 26 | 33 | 41 |
| Bean | 0 | 58 | 42 |

The abnormal growth showed in the case of beans and radish swollen roots and in the case of corn swollen tops. Also the root pipes were dead with corn and beans. Selectivity for wheat was indicated in this test also. The product of Example 2 was also tested for post-emergent activity. At 19 pounds per acre of active ingredient concentration tests were made on duplicate flats of 12″ x 18″ containing 8 varieties of young plants: radish, ryegrass, cotton, tomatoes, beans, oats, pigweed and crabgrass. Each flat was evenly sprayed with 30 ml. of 1% active solutions. Ratings were made 1, 7 and 14 days after application. After 7 days the order of effect was as follows: (most to least) crabgrass, radish, cotton, tomatoes, ryegrass, beans, with very little effect on pigweed and oats. The post-emergent activity was moderate in degree.

In another phytotoxicity evaluation the product of Example 2 was used at 2500 p.p.m. concentration. The solution of the product was pipetted in 5 cc. quantities onto filter paper contained within plastic Petri dishes. Seeds of the selected crops are placed on the treated disks and observed for germination over a period of time. The number of seeds germinating and general observations on extent of root and octyledon damage shows herbicidal potential and phytotoxic activity. Phytotoxicity rating, depending on damage to plants, is 0 to 5, the rating 5 being the highest degree. The percent emergence after 7 days was as follows: barley 0%, radish 36%, flax 6% and tomato 2%. Phytotoxicity rating was for the various crops as follows: barley, flax and tomato 5, each, radish 4.

A fungicidal evaluation was made with the product of Example 2. Oat seed known to be heavily infected with *Helminthosporium avenae* is treated with candidate chemicals in this test at various dosages for a period of fifteen minutes by immersion. At the end of this period the solution is drained off and the seed is then plated out on Petri dishes containing moistened filter paper. Lack of control is evident by the dark colored organism sporulating in profusion on the seed surface and on the filter paper adjoining the seed. Percent disease control ratings are taken at intervals after initiation of the test. The following data were obtained:

| Dose, p.p.m. | Percent Germination | Percent Disease Control |
|---|---|---|
| 5,000 | 0 | 100 |
| 500 | 72 | 22 |
| 50 | 66 | 12 |

The fungicidal activity is distinct. The active range is between 500 and 5000 p.p.m. concentration. In a Soil-Inoculum-Broth culture test, to determine anti-fungal and anti-bacterial activity, the chemical was measured in 10 ml. quantities into test tubes containing sufficient nutrient broth to give the final concentration required. To each tube 1 ml. of uniformly dried and prepared soil from a stock source for the mixture of organisms originating from the soil. The product of Example 2 showed distinct biocidal activity in this test at 5000 p.p.m. concentration, preventing the growth of fungi and bacteria.

A post-emergent herbicidal test was made with the product of Example 2, as follows. Seven crops, outlined in Table III, were planted as a group in rows on flats in the order given in the table. The plants were about three weeks old at time of application. The plants of Table IV: cotton, crabgrass and beans, were all grown in 4 inch pots because of difference in growth characteristics. The cotton was about seven weeks old, the crabgrass was in seedling stage and about four weeks old and the beans (Red Kidney) were about one month old and had well developed trifoliate leaves at time of application. As solvent-emulsifier systems have great activity, two formulations were used in making emulsion concentrates with the product of Example 2. In both formulations the product was 10% by weight, and there was present as emulsifying agent (surface active agent) Triton X-161 in the amount of 10% by weight (a blend of alkyl aryl polyether alcohols with organic sulfonates). In Formula 1, 80% by volume of Espesol-5 was used as solvent. Espesol-5 is an aromatic solvent corresponding to xylene, derived from petroleum. In Formula 2, 80% by volume of a solvent mixture was used, which consisted of 20% methyl acetate and of 80% Velsicol AR-50G. Velsicol AR-50G is an aromatic hydrocarbon oil consisting of methylated naphthalenes. It is an aromatic petroleum derivative solvent. Its specific gravity at 60° F. is 0.947–0.963, has a Kauri-Butanol Value of 80, initial boiling point 390° F. and distills 90% up to 510–530° F. with an endpoint of 550° F. maximum. Two dosage levels were used: 2000 p.p.m. and 4000 p.p.m. These correspond to about 2½ pounds and respectively 5 pounds per acre application. Phytotoxicity ratings are expressed 0 to 10. Zero indicates that there was no damage to the plants. The maximum rating of 10 was given where the plants were either all killed or so severely injured, that their recovery was not possible. Controls were carried out without treatment and with the solvent formulations without the active product. Table III shows the results with seven crops and Table IV with three others, individually tested. The first line is 48 hours and the second line is 7 days reading. "F" stands for formula. (R) means recovering.

the product of Example 2 showed in 48 hours 95% insects affected and 5% killed and in 5 days period 100% kill, indicating distinct insecticidal activity. In a check none were killed or affected in a 5 days period. Another insecticidal screening test was carried out with the same product using pomace fly (Drosphila melanogaster) in a contact exposure to film method. Drosophila cultures are carried in a routine manner under controlled temperature and humidity conditions. Adults of uniform age are used in the test. Test materials are deposited within the test

TABLE III

| Product | Solvent Used | Dose, p.p.m. | Phytotoxicity Rating | | | | | | |
|---------|--------------|--------------|----------|--------|--------|------|---------|------|-------|
| | | | Beets | Tomato | Radish | Flax | Ryegrass | Oats | Wheat |
| Ex. 2 | F.(1) | 4,000 | 0 | 2 | 2 | 8 | 4 | 7 | 1 |
| | | | 0 | 2 | 2 | 7 | 3 | (R)6 | 0 |
| Ex. 2 | F.(1) | 2,000 | 0 | 1 | 1 | 8 | 3 | 1 | 0 |
| | | | 0 | 1 | 1 | 8 | 1 | (R)1 | 0 |
| Ex. 2 | F.(2) | 4,000 | 7 | 10 | 10 | 10 | 9 | 9 | 5 |
| | | | 7 | 10 | 10 | 10 | 7 | 10 | (R)4 |
| Ex. 2 | F.(2) | 2,000 | 1 | 6 | 1 | 9 | 2 | 1 | 0 |
| | | | 1 | 7 | 1 | 9 | *2 | 3 | 0 |
| Check | F.(1) | 4,000 | 0 | 2 | 1 | 2 | 1 | 1 | 0 |
| | | | 0 | 2 | 1 | 3 | 1 | 1 | 0 |
| Check | F.(2) | 4,000 | 0 | 6 | 0 | 5 | 0 | 1 | 0 |
| | | | 1 | 5 | 0 | 5 | 0 | 1 | 0 |
| Check | | | 0 | 0 | 0 | 0 | 0 | 0 | 0 |

*Older leaves dying and bronzing from tip down.

The solvents in the checks were used at comparable level to the dosage present with 4000 p.p.m. concentration of the active product. The solvent of Formula (1) hardly affected the plants. The solvent of Formula (2) had a greater effect. In both cases only sensitive plants, like tomato and flax were affected. At an equivalent of 2000 p.p.m. dosage the same solvents showed no effect. The product of Example 2 showed much greater effect in Formula (2). This illustrates the importance of the solvent system in the emulsion concentrates. In the higher concentration all plants were affected, with wheat the least. In the lower concentration, in decreasing order, flax, tomato, oats and ryegrass were affected. For wheat the compound is selective, causing hardly any damage, i.e. none, except in the higher concentration with Formula (2), showing signs of recovery.

TABLE IV

| Product | Solvent Used | Dose, p.p.m. | Phytotoxicity Rating | | |
|---------|--------------|--------------|--------|-----------|-------|
| | | | Cotton | Crabgrass | Beans |
| Ex. 2 | F.(1) | 4,000 | 2 | 2 | 2 |
| | | | 2 | 1 | 2 |
| Ex. 2 | F.(1) | 2,000 | 1 | 2 | 0 |
| | | | 1 | 1 | 0 |
| Ex. 2 | F.(2) | 4,000 | 3 | 9 | 2 |
| | | | 3 | 10 | 2 |
| Ex. 2 | F.(2) | 2,000 | 1 | 9 | 0 |
| | | | 0 | 8 | 0 |
| Check | F.(1) | 4,000 | 0 | 0 | 0 |
| | | | 0 | 0 | 0 |
| Check | F.(2) | 4,000 | 0 | 2 | 0 |
| | | | 0 | 2 | 0 |
| Check | | | 0 | 0 | 0 |

The solvent of Formula (2) had a slight effect on crabgrass. Otherwise the solvent checks gave negative results. The most noticeable effect is the activity of the product of Example 2 on crabgrass in both concentrations.

One of the insecticidal screening tests was made with the Contact Residual Film Test with confused flour beetle (Tribolium confusum). The chemical tested is prepared as wettable powder or in acetone solution. In the next step 1 ml. of the chemical-dosage is deposited uniformly over a 9.6 cm. diameter Petri plate. Uniform distribution is provided and the chemical is permitted to dry to a film-like thin layer. Adult confused flour beetles, priorly starved for 24 hours, are then placed, ten per plate, on duplicate test vessels. The Petri plates are closed during the period of observation. At 5000 p.p.m. concentration tubes (25 mm. x 200 mm.) in a volatile solvent, such as acetone, and rotated to obtain a uniform thin film of the toxicant on the walls of the test tubes. Ten flies are released into each tube and then stoppered with an absorbent cotton plug holding a protruding tip (Dental Gum) impregnated with sufficient liquid food to carry them for three days. In two hours at 1000 p.p.m. concentration 100% mortality was observed. A check set showed no mortality in a six hours period.

With the Contact Residual Film Test, described above, a dose-mortality value determination was made with confused flour beetle and using the product of Example 2. The following results were obtained:

| Dose, p.p.m. | Percent mortality | | |
|--------------|----------|------------|----------|
| | Two Days | Three Days | Six Days |
| 2,500 | 5 | 55 | 100 |
| 1,250 | 0 | 10 | 45 |
| 625 | 0 | 10 | 10 |

The check set did not show any mortality in six days time. The slow activity of materials against this insect species is generally known. Dose-mortality values were also established for this product with Drosophila, according to the contact exposure to film method, described above. The results were as follows:

| Dose, p.p.m. | Percent kill, 18 hours | Percent kill, 48 hours | Time for 100% knockdown |
|--------------|------------------------|------------------------|-------------------------|
| 1,000 | 100 | 100 | Less than 2 hrs. |
| 500 | 92 | 100 | Over 2 hrs. |
| 250 | 48 | 72 | Do. |
| 125 | 29 | 35 | Do. |

The $LD_{50}$ was 180 and the $LD_{95}$ was 410 (p.p.m.).

With a number of insects pesticidal tests were carried out in a combined screening for chemosterilants and insecticides. A good chemosterilant should leave the insects lively, healthy, but should either reduce the egg hatch (preferably eliminating it), or reduce and/or eliminate the viability of the eggs. As most of the females are monogamic, the sterilized males compete with the untreated males in natural application. If a candidate chemical kills the insects in such screening tests for chemosterilization, they are considered insecticides. The products of this invention show insecticidal properties.

In the tests described here below the term "pesticidal" is used to include insecticidal and chemosterilant activities, as both result by different methods in eradicating the pests discussed. If a compound causes mortality of adult insects or larvae or pupae, the action is insecticidal. If a compound reduces the process of reproduction of insects, without changing their vigor, a chemosterilant activity is obtained. In the discussion below various testing methods will be described with listing the observations made with them, when using either the product of Example 1, [O,O'-dimethyl, N-(2-chloroethyl) thiophosphoramide], or Example 2, [O,O'-diethyl, N-(2-chloroethyl) thiophosphoramide].

*Mosquito Larvicide Test:* Compounds are tested as mosquito larvicides by exposing early fourth-instar larvae of Anopheles quadrimaculatus to solutions or suspensions of the compound in water. The compounds are dissolved in acetone and added to water; water-soluble compounds remain in solution and the others become finely divided suspensions. Mosquito larvae are added to the treated water and mortality is determined after 24 hours exposure. If 95 to 100 percent mortality occurs at the initial concentration of 10 parts per million, additional tests are made to determine the minimum effective concentration.

In 24 hours time 6% of the larvae were killed at 10 p.p.m. concentration, when using the product of Example 2.

*Louse Toxicant Test:* Woolen cloth is treated with the candidate chemical and young adult body lice are exposed to the treated patches of woolen cloth. This method represents a topical contact method. The patches are dipped in 1% solutions of the chemicals in acetone or another volatile solvent and impaled on pin point to dry. Lice are exposed on the patches in glass beakers for 24 hours. Knockdown is recorded at intervals of 15 minutes, 1 hour and 3 hours, and kill at 24 hours. Patches on which all lice are dead or knocked down are retested in intervals 2 to 7 days until one or more lice are unaffected. After 31 days the test is terminated, even if the patches are still effective.

The product of Example 2 showed three hours as "knockdown" time and was effective for seven days.

*Pesticidal activity on adult house flies:* Granulated sugar is treated with an equal weight of a 1% solution of the candidate chemical. The sugar is allowed to dry, repulverized and placed in emergence cages, which contain 100 newly emerged adult flies. Cages containing untreated food are used as controls. After 3 days a dish containing untreated fly food consisting of 6 parts of sugar, 6 parts powdered non-fat dry milk and one part of powdered egg, is added to the cages of the flies. Five to seven days later ½ inch of wet NAIDM medium in a souffle cup is placed in the cage for oviposition. The same afternoon all egg masses are removed and placed in water to break up the egg masses into individual eggs. The eggs from all egg masses are mixed thoroughly and a random sample of 100 eggs is placed on a small piece of wet black cloth, which is placed on moist larval medium in a rearing container. After 3 days the eggs are examined and the percent hatch is determined. The larvae that hatch crawl from the cloth into the rearing medium, and 5 days after oviposition the number of pupae are counted to determine the number of larvae that reached the pupal stage of development. At the time the oviposition medium is added to the cages, if there is any mortality observed, mortality count of the flies is taken. The percentage of chemical in this test can be varied up and down from the 1% concentration described. In this test method the flies have access to untreated food also, after the first 3 days lapsed. Further: the chemical is in contact with sugar only thus preventing any inactivation or decomposition which may occur on contact with the powdered milk and powdered egg portion of the food.

At the test concentration of 1%, the compound of Example 2 showed no insecticidal activity, however the egg-hatch was reduced to 85% and the pupal development to 71% of the control set, indicating a mild chemosterilant activity.

The product of Example 1 showed at 1% and at 0.5% concentration insecticidal activity and 100% of the adult flies were killed. At concentrations ranging from 0.25% to 0.05% the egg-hatch ranged between 85% to 100% and pupal development between 71% and 79%. These results indicate in the higher concentrations distinct insecticidal activity and in the lower concentrations a mild chemosterilant activity.

*Pesticidal action on Mexican Fruit Flies:* Test flies are maintained in 8 cubic inch cages at about 25° C. (without humidity control) in a room ventilated by exhaust fan. The carrier food consists of granulated sugar. 100 milligrams of each compound were dissolved in acetone, added to 5 grams of food medium and tested unreplicated against 50 pairs of flies. Feeding began 1 to 2 days after flies emerged and was continuous for the duration of the experiment (20 days). Flies were egged at 13 and 20 days of age and mortality recorded at weekly intervals. Compounds were evaluated on the basis of total mortality, egg production and hatch responses elicited.

The product of Example 1 was tested with this method at the 2% concentration level, based on the food. 100% mortality of the adult flies occurred and no egg production took place.

For testing of the product of Example 2 the method was slightly modified. The 5 grams of carrier food composed of 4 parts granulated sugar and 1 part orange juice crystals. Protein hydrolysate in a separate container provided food supplement. Otherwise the method was unchanged. The product of Example 2 showed in this test 100% mortality of both male and female flies, without egg production. Lowering the concentration of the compound in the food did not cause chemosterilant activity.

Both the products of Examples 1 and 2 show insecticidal activity against Mexican Fruit Fly, when tested with this method.

*Pesticidal action on* Drosophila Melanogaster *(Pomace Fly):* The pesticidal compounds were dissolved in acetone in amounts of 1 mg. of compound in 1 ml. of acetone. Twenty newly emerged flies were first anesthetized by placing test tubes which contained the flies in ice cold water. The flies were then placed in a filter cone made of tissue paper. One ml. of acetone solution was mixed with 0.5 ml. of distilled water and poured over the flies. The flies were allowed to dry and then were placed in a small glass vial which was supplied with a small amount of canned pumpkin. After a period of 24 hours, 5 male and 5 female flies were selected and placed in a separate vial to which was attached another vial containing a pumpkin agar slant. The agar slant was replaced and examined daily. The flies were confined in the vials for a period of 9 to 11 days. Egg counts were made and expressed as average number per female per day. The composite average for a set of 3 controls with untreated food gave in this test 10 eggs per female per day and 8.3 larvae per female per day. This method illustrates a topical application of the pesticide to the insect.

The product of Example 2 was tested with this method. The egg count per female per day was 4.3 versus 10 for the controls and the larval development per female per day was 2.3 versus 8.3 for the controls. The results indicate distinct chemosterilant activity.

*Pesticidal action on Screw-worm Fly* (Cochliomyia Hominivorax): Two sets of tests were made with screwworm flies. In the first one topical application was used and in the second one oral application was used.

Topical application: Tests were made with adults less than 24 hours old. Topical treatments were made with a micrometer-controlled calibrated syringe. Two microliters of a 10% acetone solution of the test compound was applied to the dorsal thorax of each insect, anesthetized by chilling. Twenty males and twenty females were so treated with 200 micrograms of the chemical and placed in a single cage. The test was continued as described under the parallel oral application, below.

Oral application: Also here the tests were made with adults less than 24 hours old. Groups of 100 flies, not selected for sex, were caged separately for oral treatment. The flies were fed a freshly prepared quantity of sugar syrup containing 1% of the test chemical daily for 5 days. The treated food mixture was made available by spreading it over the gauze roof of the cage. A honey feeder was not supplied for oral administration experiments until after the fifth treatment day.

With the exception of the honey for the first 5 days of the oral experiments, ample quantities of water, honey and meat were provided both in Method 10 and 11, so that the flies could feed on these materials freely. On the eighth day of adult life, fecundity and hatchability were determined. Twenty or fewer females, depending on survival, were given the opportunity to lay eggs in vials containing some ground lean beef. The eggs were subsequently observed for hatching. The criterion for a successful chemosterilant compound is no oviposition or failure of eggs to hatch.

The product of Example 1 and the product of Example 2 were lethal for the adult flies both in the topical and in the oral application. 100% mortality was achieved, indicating insecticidal activity against screw-worm flies.

*Pesticidal activity on Oriental Fruit Flies (Hawaii Fruit Flies)*: Candidate sterilants and antimetabolites are tested against the oriental fruit fly, (mixed sexes) in preliminary screening. Depending on solubility, the chemicals are dissolved in water or acetone, and mixed with a hydrolized yeast protein to form a slurry at the concentration of 4% (four percent) candidate chemical in the protein, calculated on dry weight of both materials. The so treated food is made available to the flies from the time of adult emergence. Eggs are collected after 10 to 14 days and hatch noted at 48 hours. Effects on the separate sexes are not determined in this preliminary screening. If females deposit no eggs or eggs that do not hatch, the compound is subsequently tested separately on a range of dosages on each sex mated with normal flies. A control is run without the addition of chemicals.

When considering the results of this test method, it should be noted, that the concentration of chemical compound to food was at a comparatively high level and that no concentration level changes were made. Many candidate compounds showing toxicity at 4% level, could well be good chemosterilants at lower concentrations.

Both the products of Example 1 and Example 2 showed in this test at the concentration applied 100% mortality of the adult flies, which was noticed at the time of first egging. No eggs were laid. Both compounds have insecticidal activity against oriental fruit fly.

As will be apparent to those skilled in the art in the light of the foregoing disclosure, many modifications, substitutions and alterations are possible in the practice of this invention without departing from the spirit or scope thereof.

We claim:

1. A compound having the structural formula

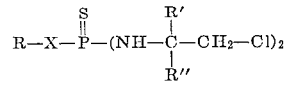

wherein R' and R" are selected from the group consisting of hydrogen, alkyl radicals of 1–12 carbons and aryl radicals of 1–12 carbons, wherein X is selected from the group consisting of oxygen, sulfur and nitrogen, and wherein R is a radical selected from the group consisting of (i) alkyl of 1–18 carbons, (ii) aryl of 6–18 carbons, (iii) alkaryl of 6–18 carbons, (iv) aralkyl of 6–18 carbons, (v) alicyclic of 3–18 carbons, (vi) heterocyclic of 5–12 carbons, and (vii) the nitrogen-free portion of a heterocyclic ring having nitrogen as the heteroatom bonded to the phosphorus, when X is nitrogen.

2. O-isoamyl, N,N'-bis(2-chloroethyl) thiophosphoramide.

References Cited

UNITED STATES PATENTS

| | | | |
|---|---|---|---|
| 2,994,638 | 8/1961 | Malz et al. | 260—959 |
| 3,115,490 | 12/1963 | Smith | 260—239 |
| 3,183,257 | 5/1965 | Miller et al. | 260—259 |

OTHER REFERENCES

Elderfield: "Heterocyclic Compounds," vol. 1, John Wiley & Sons, Inc., New York, New York (1950), pp. 68–69.

CHARLES B. PARKER, *Primary Examiner.*

FRANK M. SIKORA, ANTON H. SUTTO,
*Assistant Examiners.*